Sept. 25, 1934.  R. B. HUNTER  1,974,613
ELECTRIC CONTROLLER
Filed April 7, 1932
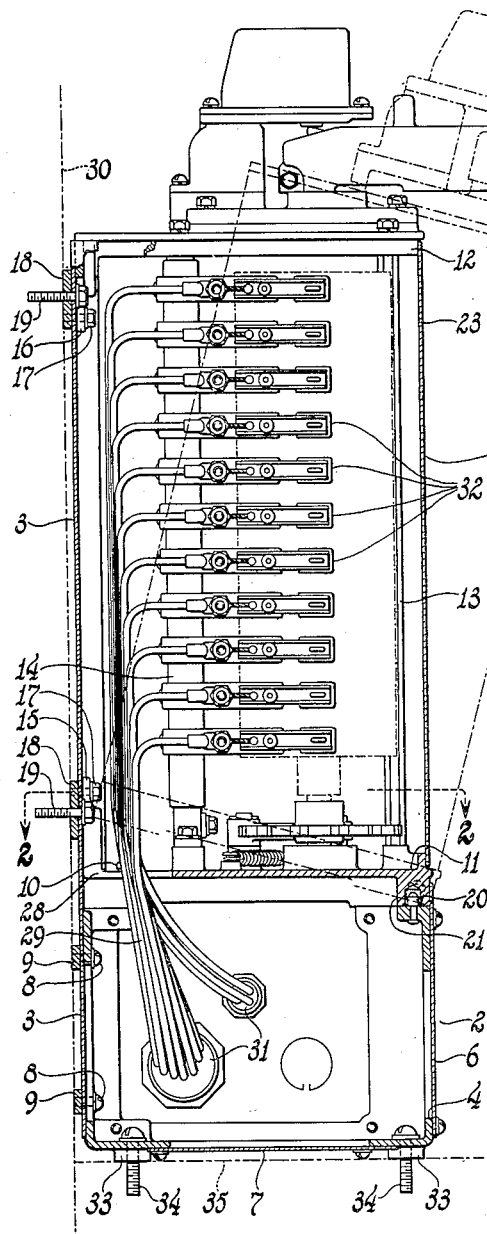
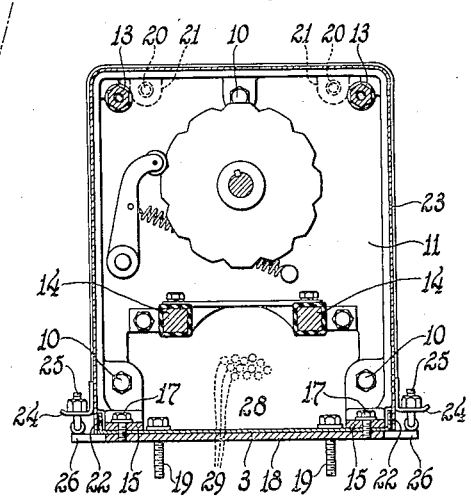
Inventor
Richard B. Hunter
By Frank H. Hubbard
Attorney Patented Sept. 25, 1934

1,974,613

UNITED STATES PATENT OFFICE 1,974,613

ELECTRIC CONTROLLER

Richard B. Hunter, Shorewood, Wis., assignor to Cutler-Hammer, Inc., Milwaukee, Wis., a corporation of Delaware Application April 7, 1932, Serial No. 603,727

6 Claims. (Cl. 247—1)

This invention relates to improvements in electric controllers and more particularly to enclosed drum controllers of the type having a conduit box associated therewith.

In drum controllers of the aforesaid type, the various connecting wires are usually brought into the conduit box through suitable openings in the sides thereof and the drum is usually provided with a back plate which is removable to facilitate attachment of the connecting wires to the drum fingers. However, in numerous instances this construction has been found objectionable. For example, where it is required to mount a controller of this character against a vertical wall, it is usually difficult after wiring to replace the removable back plate and for this reason the same is sometimes negligently omitted or improperly secured.

The present invention has among its objects to provide an improved drum controller of the aforementioned type which is of such construction as to overcome the aforementioned objection.

Another object is to provide a drum controller of the aforementioned type having improved means for mounting the same upon a support such as a vertical wall.

Various other objects and advantages of the invention will hereinafter appear.

The accompanying drawing illustrates an embodiment of the invention which will now be described, it being understood that the embodiment illustrated is susceptible of modification without departing from the spirit and scope of the appended claims.

In the drawing,

Figure 1 is a side view of a drum controller embodying the invention, the conduit box and a part of the drum enclosing case being shown in section, and Fig. 2 is a horizontal sectional view as taken on lines 2—2 of Fig. 1.

Referring to Fig. 1 of the drawing, the same illustrates a drum controller 1 which is arranged for mounting upon a conduit box 2, the latter being provided with a back plate 3 which is of such length as to provide an enclosure for an open wiring space at the rear of said controller.

Conduit box 2 comprises a frame member 4 having suitable openings in the sides thereof through which the connecting wires for the drum controller 1 may be brought into the box and passed into the wiring space at the rear of the drum. Interchangeable sheet metal plates, such as shown at 5, 6, 7 are provided for covering the bottom, side and front openings in frame 4, certain of these plates being provided with knockouts, as shown in plate 5, to provide for entrance and attachment of conduits, and the remaining plates being blank. As is apparent, the plate or plates containing knockouts may be interchanged with the blank plates, or a blank plate may be drilled to suit the particular needs of the installation.

Plate 3 provides a cover for the rear opening in frame 4 and the same is secured to said frame by screws 8 and extends upwardly to provide an enclosure for the wiring space at the rear of controller 1. Reinforcing cleats 9—9 are welded to plate 3, said cleats being provided with tapped openings for receiving the screws 8.

Controller 1 is designed for mounting upon the top of conduit box 2, and as shown the same is secured thereto by a plurality of screws 10 which pass through openings in a lower end plate 11 of said controller and take within openings in suitably located bosses on frame 4. The upper end of controller 1 is provided with a plate 12 which is rigidly secured to the lower end plate 11 by spacer rods 13—13 and contact finger supports 14—14.

The rear corners of plate 11 are provided with upwardly projecting lugs 15—15 and the rear corners of plate 12 are provided with downwardly projecting lugs 16—16. These lugs are provided with openings for receiving screws 17 which pass through openings in plate 3 into tapped openings in cleats 18—18 welded to the rear face of said plate. Screws 17 thus provide for securement of the controller 1 to plate 3, and suitable drilled openings are provided in plate 3 and cleats 18—18 to receive screws 19 by which said plate may be attached to a wall or other structure.

A pair of short upwardly projecting shouldered pins 20—20 are fixed to lugs on the front edge of frame 4 and plate 11 of controller 1 is provided with bosses 21—21 having openings therein for receiving said pins. As is apparent, pins 20—20 act as pivots to facilitate forward tilting of the controller 1 upon the conduit box, as shown in dotted lines, and also serve to properly position said controller upon the conduit box for securement thereof to plate 3 by the screws 17.

As shown in Fig. 2, plate 3 is provided with forwardly bent marginal portions 22—22 on opposite sides thereof and frame 4 of the conduit box and end plates 11 and 12 of the controller 1 are recessed to receive such portions. A sheet metal hood 23 is provided for enclosing the front and sides of controller 1, said hood being arranged to overlap the marginal portions 22—22 on plate 3 to provide a substantially dust tight enclosure for the controller. Hood 23 has slotted ears 24 fixed to opposite sides thereof and hinged clamping screws 25 are mounted upon projecting ends 26 of the cleats 18 for engagement with said ears to hold said hood in assembled position. Also as shown in Fig. 2, the lower end plate 11 is provided with a relatively large opening 28 disposed between the lugs 15—15 and open to the rear, through which the wires 29 are passed into the controller wiring space from conduit box 2.

In installations where the controller is mounted upon a vertical wall or other structure represented by a dot and dash line 30 in Fig. 1 the conduit box 2 is fixed thereto by the screws 19. Upon mounting of the conduit box the necessary connecting wires 29 are brought into the conduit box through the usual conduits 31 and with hood 23 removed the controller 1 is placed upon said box with the pins 20—20 in registry with the openings in bosses 21—21. By tilting the controller 1 forwardly as shown in dotted lines the connecting wires can be readily arranged within the opening 28 and connected to the contact fingers 33 of the controller. After wiring, controller 1 is swung to its full line position and the same is then secured to the conduit box by screws 10 and to the back plate 3 by screws 17, the hood 23 being thereafter mounted upon the controller.

To provide for mounting of the controller upon a floor or other structure indicated by a dot and dash line 35 in Fig. 1, the frame 4 of the conduit box is provided with bosses 33 having openings therein for receiving securing screws 34.

What I claim as new and desire to secure by Letters Patent is:

1. The combination with an open top conduit box having an upwardly projecting wall on the rear thereof for securement to a support, of a controller mounted upon said box and covering the top opening therein, said controller having an open wiring space at the rear thereof arranged to be enclosed by the projecting rear wall of said conduit box.

2. The combination with a drum controller having an open wiring space located at the rear thereof, of a conduit box associated with the lower end of said controller, one of the side walls of said conduit box being extended upwardly to provide an enclosure for said wiring space, securing means associated with said wall to provide for suspension of said conduit box from a vertical support, and means for detachably securing said controller to said conduit box.

3. The combination with an open top conduit box having an upwardly projecting wall on the rear thereof for securement to a support, of a controller mounted upon said box and covering the top opening therein, said controller having a removable hood associated therewith for enclosing the front and sides thereof and having an open wiring space at the rear thereof arranged to be enclosed by the projecting rear wall of said conduit box.

4. The combination with an open top conduit box having an upwardly projecting wall on the rear thereof adapted to be secured to a vertical support, of a drum controller mounted upon the top of said box and secured to the rear wall thereof, said controller having an open wiring space at the rear thereof to be enclosed by the rear wall of said conduit box and a hood associated with said controller for enclosing the front and sides thereof, said hood being detachably secured to the rear wall of said conduit box.

5. In combination, a conduit box having an upwardly projecting rear wall, means associated with said wall whereby the conduit box may be suspended from a vertical support, a drum controller for mounting upon the top of said conduit box, said controller having an open wiring space at the rear thereof to be enclosed by the upwardly projecting rear wall of said conduit box, and means associated with said controller for securing the same to the top of said conduit box and to the rear wall thereof.

6. In combination, a conduit box having an upwardly projecting rear wall, a drum controller for mounting upon the top of said box, said controller having an open wiring space at the rear thereof to be enclosed by the upwardly projecting rear wall of said conduit box, means for detachably securing said controller to said conduit box, said conduit box and said controller having cooperating parts forming a fulcrum for said controller to facilitate forward tilting thereof on said conduit box during wiring thereof.

RICHARD B. HUNTER.